United States Patent
Hatami Aghdam et al.

(10) Patent No.: US 10,551,002 B2
(45) Date of Patent: Feb. 4, 2020

(54) CRYOGENIC TANK ASSEMBLY WITH A PUMP DRIVE UNIT DISPOSED WITHIN FLUID STORAGE VESSEL

(71) Applicant: Westport Power Inc., Vancouver (CA)

(72) Inventors: Kamal Hatami Aghdam, Vancouver (CA); Davor Baros, Vancouver (CA); Cameron G. D. Scott, New Westminster (CA); Timothy S. Coleman, Coquitlam (CA); Samira Barakat-Hamel, Port Moody (CA)

(73) Assignee: WESTPORT POWER INC., Vancouver (CA)

( * ) Notice: Subject to any disclaimer, the term of this patent is extended or adjusted under 35 U.S.C. 154(b) by 0 days.

(21) Appl. No.: 15/561,943

(22) PCT Filed: Mar. 24, 2016

(86) PCT No.: PCT/CA2016/050353
§ 371 (c)(1),
(2) Date: Sep. 26, 2017

(87) PCT Pub. No.: WO2016/154741
PCT Pub. Date: Oct. 6, 2016

(65) Prior Publication Data
US 2018/0119883 A1    May 3, 2018

(30) Foreign Application Priority Data
Mar. 27, 2015 (CA) ..................... 2886538

(51) Int. Cl.
*F17C 5/02* (2006.01)
*F17C 9/00* (2006.01)

(52) U.S. Cl.
CPC ................ *F17C 9/00* (2013.01); *F17C 5/02* (2013.01); *F17C 2201/0109* (2013.01);
(Continued)

(58) Field of Classification Search
CPC ...... F17C 9/00; F17C 5/02; F17C 7/02; F17C 7/00; F17C 2227/0128; F17C 2227/0135; F17C 2227/0142
See application file for complete search history.

(56) References Cited

U.S. PATENT DOCUMENTS 4,477,232 A * 10/1984 Mayer ................... F04B 9/1178
  417/342
6,659,730 B2   12/2003 Gram et al.
(Continued)

FOREIGN PATENT DOCUMENTS

CA         2853324     *  8/2014   ............... F17C 3/08
CA         2853324 A1    8/2014
(Continued)

OTHER PUBLICATIONS

International Search Report and Written Opinion of the International Searching Authority, dated Apr. 7, 2016.
(Continued)

*Primary Examiner* — Brian M King
(74) *Attorney, Agent, or Firm* — Carie C. Mager

(57) ABSTRACT

A fluid storage and pressurizing assembly includes a storage receptacle and a pump assembly. The storage receptacle includes an inner vessel defining a cryogen space for storing a fluid at a storage pressure and a cryogenic temperature, an outer vessel surrounding the inner vessel, and an insulated space between the inner vessel and the outer vessel, and a pump assembly. The pump assembly includes a pump having an inlet disposed within the cryogen space for receiving a quantity of the fluid from the cryogen space, and an outlet for delivering the fluid therefrom, and a pump drive unit for driving the pump, the pump drive unit being at least partially disposed within a space defined by the storage receptacle.

20 Claims, 3 Drawing Sheets

(52) U.S. Cl.
CPC .............. *F17C 2201/0119* (2013.01); *F17C 2201/0147* (2013.01); *F17C 2201/032* (2013.01); *F17C 2201/056* (2013.01); *F17C 2203/014* (2013.01); *F17C 2203/03* (2013.01); *F17C 2203/0629* (2013.01); *F17C 2221/012* (2013.01); *F17C 2223/0161* (2013.01); *F17C 2223/033* (2013.01); *F17C 2227/0142* (2013.01); *F17C 2227/0178* (2013.01); *F17C 2270/0171* (2013.01); *F17C 2270/0173* (2013.01)

(56) References Cited

U.S. PATENT DOCUMENTS

| | | | | |
|---|---|---|---|---|
| 2003/0221433 | A1* | 12/2003 | Gustafson | ................ F17C 5/06 62/48.1 |
| 2014/0026597 | A1* | 1/2014 | Epstein | ................ B64D 37/30 62/48.2 |
| 2014/0166671 | A1 | 6/2014 | Downie | |

FOREIGN PATENT DOCUMENTS

| | | |
|---|---|---|
| CN | 1564910 A | 1/2005 |
| CN | 103249985 A | 8/2013 |
| WO | 1999028670 A1 | 6/1999 |

OTHER PUBLICATIONS

CN Search Report, dated Mar. 28, 2019.
Extended European Search, dated Oct. 22, 2018.

\* cited by examiner

CRYOGENIC TANK ASSEMBLY WITH A PUMP DRIVE UNIT DISPOSED WITHIN FLUID STORAGE VESSEL

TECHNICAL FIELD

The present application relates to a cryogenic tank assembly, and more particularly to a cryogenic tank assembly having both a pump and a pump drive unit disposed within a storage vessel.

BACKGROUND

Developments in combustion engine technology have allowed for the use of gaseous fuels instead of diesel as a fuel, without sacrifices to vehicular performance or delivery. As used herein, gaseous fuels are defined as those fuels that are in the gas phase at standard temperature and pressure, which in the context of this application is 21 degrees Celsius (° C.) and 1 atmosphere (atm). Exemplary gaseous fuels include natural gas, methane, hydrogen and other combustible hydrocarbon derivatives. Because of its ready availability, low cost and potential for reducing particulate emissions, natural gas is increasingly used as the gaseous fuel of choice, to fuel a range of industrial and vehicle engines, including mine trucks, locomotives, ships and other heavy goods vehicles (HGVs). To increase the energy density of natural gas storage, especially on vehicles, liquefied natural gas (LNG) is an attractive solution compared to compressed natural gas (CNG) because of the higher energy density that can be achieved at much lower storage pressures.

Natural gas fuelled direct injection engines that can deliver similar performance profiles to diesel engines require the fuel to be delivered to the engine at high pressures, to overcome the in-cylinder pressure for late-cycle injection. In addition, a storage vessel for storing a cryogenic fluid, such as LNG must be adequately thermally insulated to maintain the stored LNG at cryogenic temperatures. Cryogenic temperatures are defined herein to be temperatures at which gaseous fuels will remain in liquefied form at a predetermined storage pressure.

Thermal insulation prevents heat transfer from the surrounding environment to the cryogen space within the storage vessel, because heat entering the cryogen space can cause the LNG to boil, increasing the vapor pressure within the vessel. If the vapor fluid pressure exceeds a predetermined pressure limit, to prevent any damage to the storage vessel, fuel pump or any other parts of a cryogenic tank assembly, a pressure relief valve is triggered to vent vapor from the cryogen space. It is undesirable to vent vapor from the cryogen space, so in addition to the thermal insulation, conventional cryogenic tank assemblies also avoid locating anything inside the storage vessel that can introduce heat into the cryogen space. The applicant has patented some inventive cryogenic tank assemblies that do place a pump inside the cryogen space with a hydraulic pump drive located outside the storage vessel, for example U.S. Pat. No. 7,293,418 B2. The temperature of hydraulic fluid employed by the hydraulic pump drive can be in the range of 65° C. and 90° C., and when compared to a typical temperature for LNG of on the order of −160° C. forms a very large temperature gradient therebetween. In addition to the challenge of preventing heat from entering the cryogen space, there are other challenges associated with locating a pump drive unit inside the storage vessel, such as preventing the freezing of hydraulic fluid lines if the drive unit is a hydraulic drive unit.

Accordingly, there is a need for an improved cryogenic fuel storage and pressurizing assembly suited for large-scale cryogenic storage vessels, that increases the fuel storage volume within the designated fuel storage space on board the vehicle, while mitigating the challenges associated with locating a hydraulic pump drive unit within the cryogenic fuel storage and pressurizing assembly.

SUMMARY

The claimed system is a fluid storage and pressurizing assembly that includes a storage receptacle with an inner vessel defining a cryogen space capable of storing fluid at a cryogenic temperature and a storage pressure, an outer vessel surrounding the inner vessel, and an insulated space between the inner vessel and the outer vessel. The entire cryogen space is thus defined by the inner vessel and surrounded by the insulated space. The insulated space can be evacuated to create a vacuum insulated space.

The inner vessel and outer vessel further include a sleeve, whereby the sleeve of the outer shell extends within the sleeve of the inner vessel into the cryogen space, with the insulated space extending the sleeve of the outer vessel and the sleeve of the inner vessel.

The storage and pressurizing assembly also includes a pump assembly to receive the cryogenic fluid from the cryogen space and deliver it therefrom. Specifically, the pump assembly includes a pump with an inlet disposed within the cryogen space, and an outlet for delivering the fluid to an accumulator or other pressurized-fluid receiving device. The pump assembly also includes a pump drive unit, at least partially disposed within a space defined by the storage receptacle. The pump drive unit controls the pump such that the fluid received and delivered by the pump is in response to the engine needs.

The pump drive unit is disposed within the storage receptacle such that the pump drive unit is at least partially recessed within the sleeve of the outer vessel. In exemplary embodiments, the pump drive unit is fully recessed within the sleeve of the outer vessel, and is disposed between the cryogen space, as defined by the inner vessel.

The pump assembly is disposed within the storage receptacle such that the pump is immersed in the cryogen space, which allows the pump to be in a continuously cooled down state, and the pump drive unit is substantially disposed within the sleeve of the outer shell.

In an exemplary embodiment, the pump is a reciprocating piston pump, with at least one piston disposed within the pump cylinder, and is capable of pressurizing the fluid to a pressure between 2500 pounds per square inch (psi) and 9500 psi. The reciprocating piston pump is preferably actuated by a hydraulic drive unit.

The hydraulic drive unit comprises a hydraulic cylinder and a piston reciprocable therein, and a drive shaft connected with the piston extending out of the hydraulic cylinder for actuating the pump and a hydraulic fluid weep line associated with the drive shaft for collecting hydraulic fluid leaking from the hydraulic cylinder along the drive shaft.

Because the presently claimed system locates the pump drive unit within the inner vessel, the traditional configuration of the weep line is such that the weep line would be exposed to the cryogenic temperatures within the storage receptacle. The fluid in the weep line is thus susceptible to freezing at these temperatures, which is undesirable. In exemplary embodiments, the hydraulic weep line is associated with an endplate of the hydraulic cylinder, proximate to the pump, and is nested within one of a first hydraulic fluid line or a second hydraulic fluid line. The weep line is thus insulated from the cryogenic temperatures within the storage receptacle; by nesting the weep line within the hydraulic fluid line, the continuous flow of warm fluid within the hydraulic fluid lines will reduce freezing within the weep line.

In alternate embodiments, various other drivers can be used to drive the reciprocating piston. By way of example, these may include electric motors, mechanical drive units, pneumatic drive units, or any other drive unit that doesn't depart from the spirit of the presently claimed system.

In yet another alternate embodiment, the pump drive unit is surrounded by thermal insulation, to ensure that the cryogenic temperature within the cryogen space does not affect the performance of the pump drive unit, and to reduce the heat leak from the pump drive unit into the cryogen space, which may raise the temperature of the fluid and cause some of it to turn to vapor. The thermal insulation may include an aerogel jacket, or any other suitable insulation.

In an exemplary embodiment, the fluid storage and pressurizing assembly is intended for use with liquefied natural gas (LNG) or any other cryogenic fluid suitable for use as a vehicular fuel. The storage and pressurizing assembly is further intended for use on board heavy duty vehicles including mine haul trucks with a storage volume of up to 2000 US gallons and other heavy goods vehicles (HGVs).

DETAILED DESCRIPTION

Throughout the following description, specific details are disclosed to provide a more thorough understanding of the claimed system. However, some well-known elements have not been shown or described in detail to avoid obscuring the presently disclosed system. Accordingly, the specification and drawings are to be regarded in an illustrative, rather than restrictive, sense. The drawings are not to scale.

Figure 1:
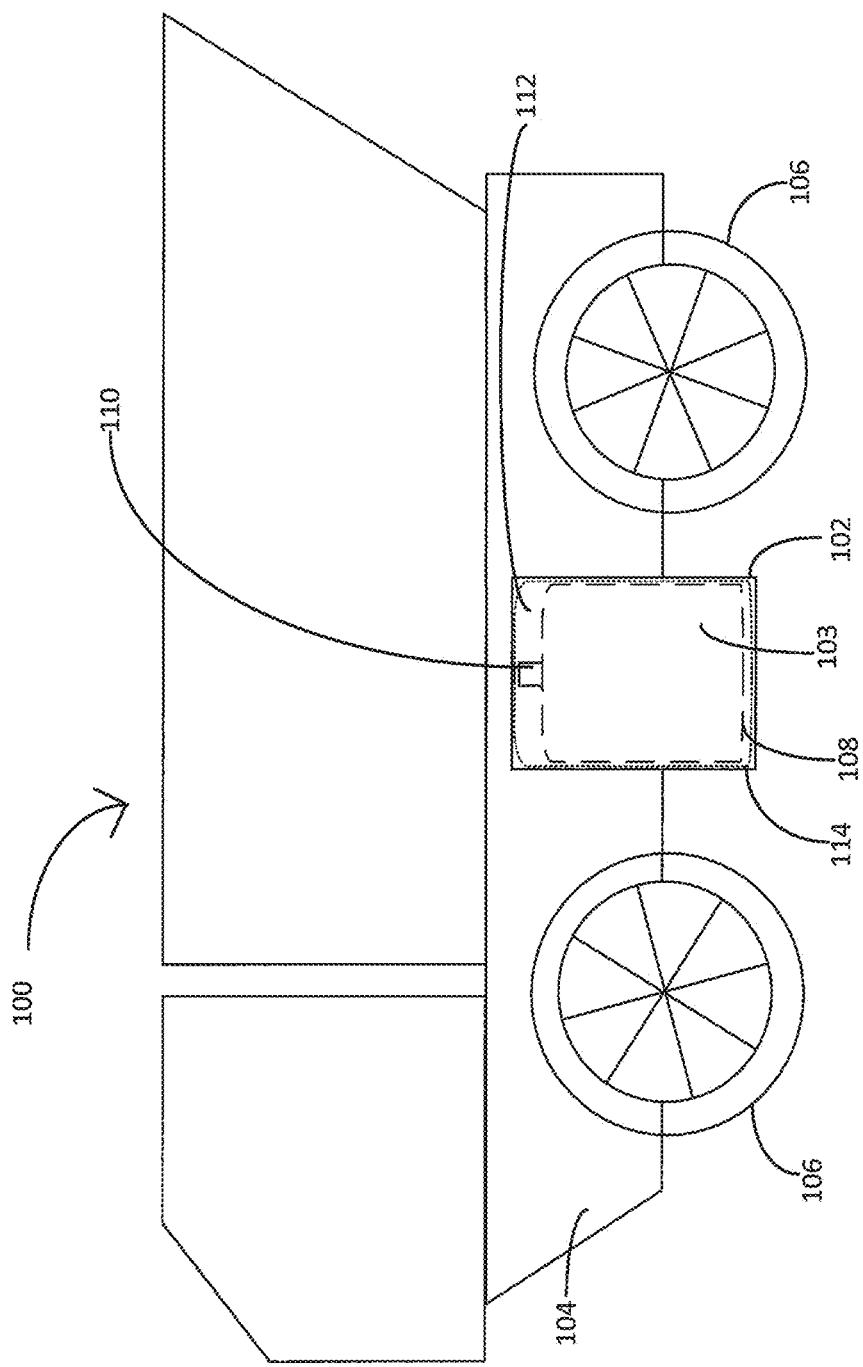
FIG. 1 is a schematic view of a vehicle with the gaseous fuel storage assembly shown.

With reference to FIG. 1, vehicle 100 is shown with enclosure 102, located on vehicle chassis 104, and between wheels 106. Space 103 defines at least the vertical space available for a cryogenic-fuel storage receptacle, and can be defined at least partially by enclosure 102. Vehicle 100 is, in an exemplary embodiment, a large heavy goods vehicle, however the vehicle can be understood to be any vehicle with an on-board tank assembly for storing cryogenic fuel. There is limited space available for the cryogenic fuel storage assembly, and the shape of conventional prior art cryogenic storage receptacle 108 with pump drive unit 110 located external to storage receptacle 108 results in empty space 112 extending annularly around the pump drive unit, within enclosure 102. Thus the presently claimed system aims to provide a more compact arrangement for increasing the volume of fuel that can be stored within the available enclosure 102, by locating pump drive unit 110 within cryogenic storage receptacle 108, such that empty space 112 is incorporated as part of the available fuel storage volume of cryogenic storage receptacle 108, as shown by outline 114. Outline 114 thus represents the total space available for cryogenic storage fuel storage when pump drive unit 110 is located within cryogenic storage receptacle 108, which is greater than that available when pump drive unit is located external to cryogenic storage receptacle 108.

Generally, the presently claimed system relates to a cryogenic fluid storage and pressurizing assembly that includes a storage receptacle with a cryogen space capable of storing fluid at a cryogenic temperature and at a storage pressure within a predetermined range, and a pump assembly. The pump assembly includes a pump for receiving the cryogenic fluid and delivering it to a user at a higher pressure, and a pump drive unit to drive the pump. In exemplary embodiments, both the pump and the pump drive unit are fully disposed within the storage receptacle, resulting in a more compact arrangement such that the storage receptacle incorporates the empty space that would conventionally surround it, thus increasing the total available cryogenic fluid storage volume. For other applications, such as rail tender cars, the storage receptacle diameter can be made larger while maintaining the same overall height because the pump drive unit need not extend above the level of the storage receptacle. While it is already known to locate a pump inside the storage receptacle, locating the pump drive unit inside a storage receptacle for fluids stored at cryogenic temperatures is more challenging. When exposed to cryogenic temperatures within the storage receptacle, a pump drive unit may freeze up and be rendered inoperative. The pump drive unit thus needs to be insulated from the cryogenic temperature within the storage receptacle. Pump drive units are generally known to be a source of heat when in use, thus adequate insulation is also needed to prevent heat generated in the pump drive unit from being transferred into the cryogen space, which may heat up the cryogenic fluid, transforming it into vapor. This increases the pressure within the storage receptacle, and may eventually need to be vented to prevent damage to the cryogenic tank assembly, which is undesirable. The cryogenic fluid storage and pressurizing assembly can be used to store and pressurize LNG) or any other cryogenic fluid suitable for use as a vehicular fuel. The storage and pressurizing assembly can be used on board heavy duty vehicles including mine trucks with a storage volume capacity up to 2000 US gallons, and other HGVs.

Figure 2:
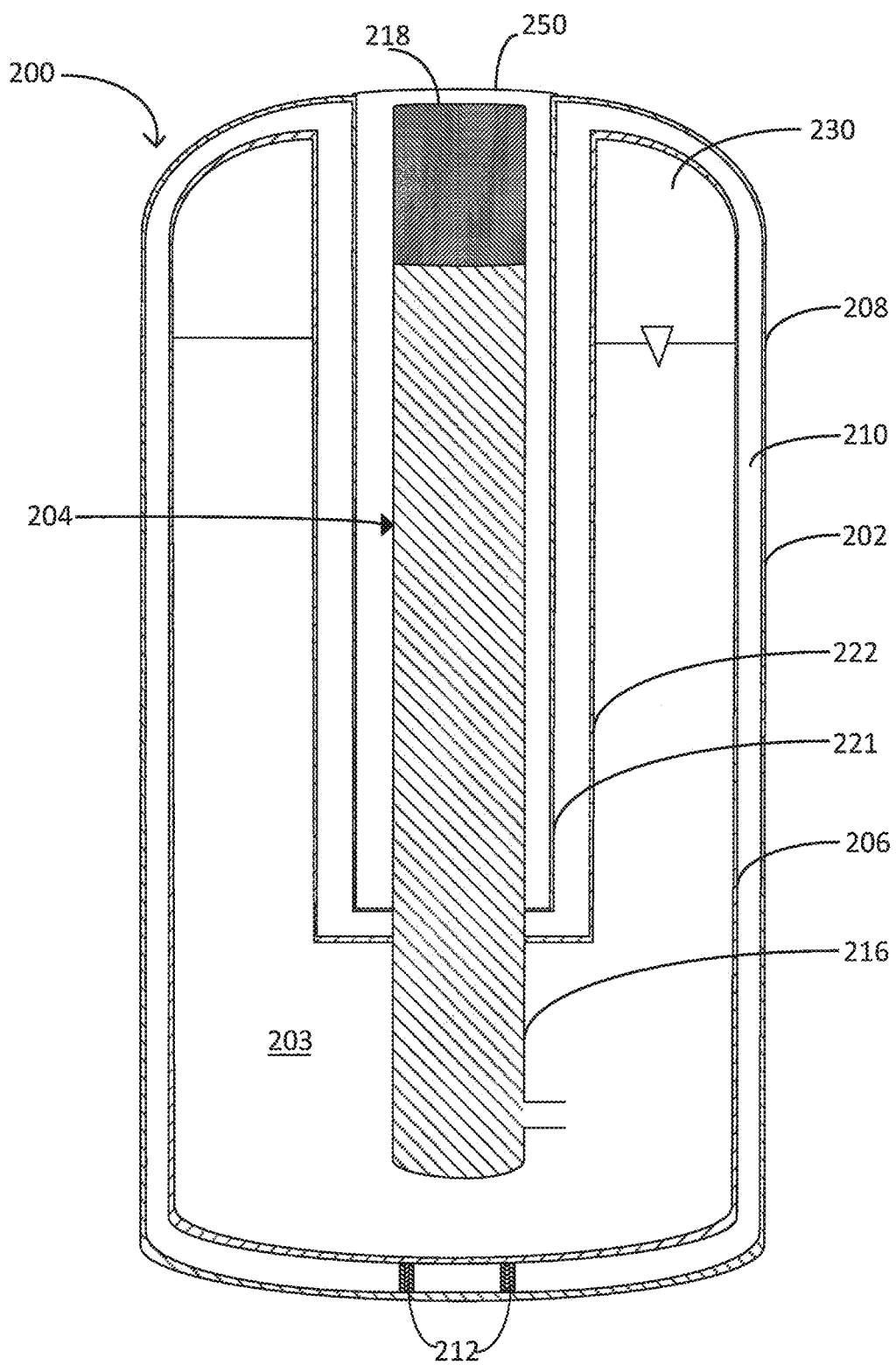
FIG. 2 is a cross sectional view of a cryogenic fluid storage and pressurizing assembly that includes a storage receptacle and a pump assembly, with a pump drive unit of the pump assembly located within the storage receptacle

With reference to FIG. 2, cryogenic fluid storage and pressurizing assembly 200 is shown, with storage receptacle 202 and pump assembly 204. Storage receptacle 202 comprises inner vessel 206 which defines the boundaries of cryogen space 203, and outer vessel 208. Inner vessel 206 and outer vessel 208 are separated by insulation space 210, which may be evacuated to provide thermal insulation, to insulate cryogen space 203 from outer vessel 208 and the ambient environment surrounding outer vessel 208.

Inner vessel 206 comprises a sleeve (222), and outer vessel 208 comprises a sleeve (221). Sleeve 221 of outer vessel extends within sleeve 222 of inner vessel into cryogen space 203, such that insulation space 210 extends between the sleeves.

Inner vessel 206 is supported within outer vessel 208 by support structures 212, which are designed to reduce thermal conduction between outer vessel 208 and inner vessel 206. These support structures 212 are shown, in FIG. 2 to be at the bottom of the vessel, however they may be any mechanical or structural component that supports outer vessel 208 from inner vessel 206 and can be located at any location that provides adequate support of inner vessel 206 from outer vessel 208.

In this illustrated embodiment, pump assembly 204 includes pump 216 operatively connected to pump drive unit 218, both fully disposed within storage receptacle 202. More specifically, pump assembly 204 is disposed within outer pump sleeve 222, located within cryogen space 203. Insulation space 210 thus provides thermal insulation between cryogen space 203 and pump assembly 204 (except the portion of pump assembly 204 that extends into cryogen space 203), and more specifically, thermal insulation between pump drive unit 218 and cryogen space 203, to minimize any transfer of heat generated by pump drive unit 218 to the fluid stored within cryogen space 203, to prevent undesirable vaporization and venting.

In the illustrated embodiment still, pump assembly 204 is fully located within storage receptacle 202, such that pump drive unit 218 does not extend beyond covering 250, which connects with the top of outer vessel 208 and covers pump assembly 204. In this arrangement, storage receptacle 202 can be made larger, such that space 230, corresponding to empty space 112 in FIG. 1, is incorporated as part of cryogen space 203, increasing the total storage volume available for cryogenic fluid (when compared to the total storage volume available for cryogenic fluid when pump drive unit 218 is located entirely outside storage receptacle 202, and more specifically, outside outer vessel 208).

In other embodiments (not illustrated), locating pump drive unit 218 only partially within storage receptacle 202 can still provide a more compact arrangement compared to previously known arrangements that locate the entire pump drive unit 218 outside of outer vessel 208.

In an exemplary embodiment, pump 216 is a reciprocating piston pump that has pump inlet 220 located toward the bottom of storage receptacle 202 within cryogen space 203. Pump 216 is shown immersed in cryogen space 203. This allows pump 216 to be maintained at the temperature of the stored cryogenic fluid, such that pump 216 does not need to be cooled to cryogenic temperatures before operation. In an exemplary embodiment, pump drive unit 218 is a hydraulically driven drive unit, however numerous other drive units may be substituted based on the application requirements. By way of example, these substitute drive units may include pneumatic drivers, mechanical drivers and electric motors.

Figure 3:
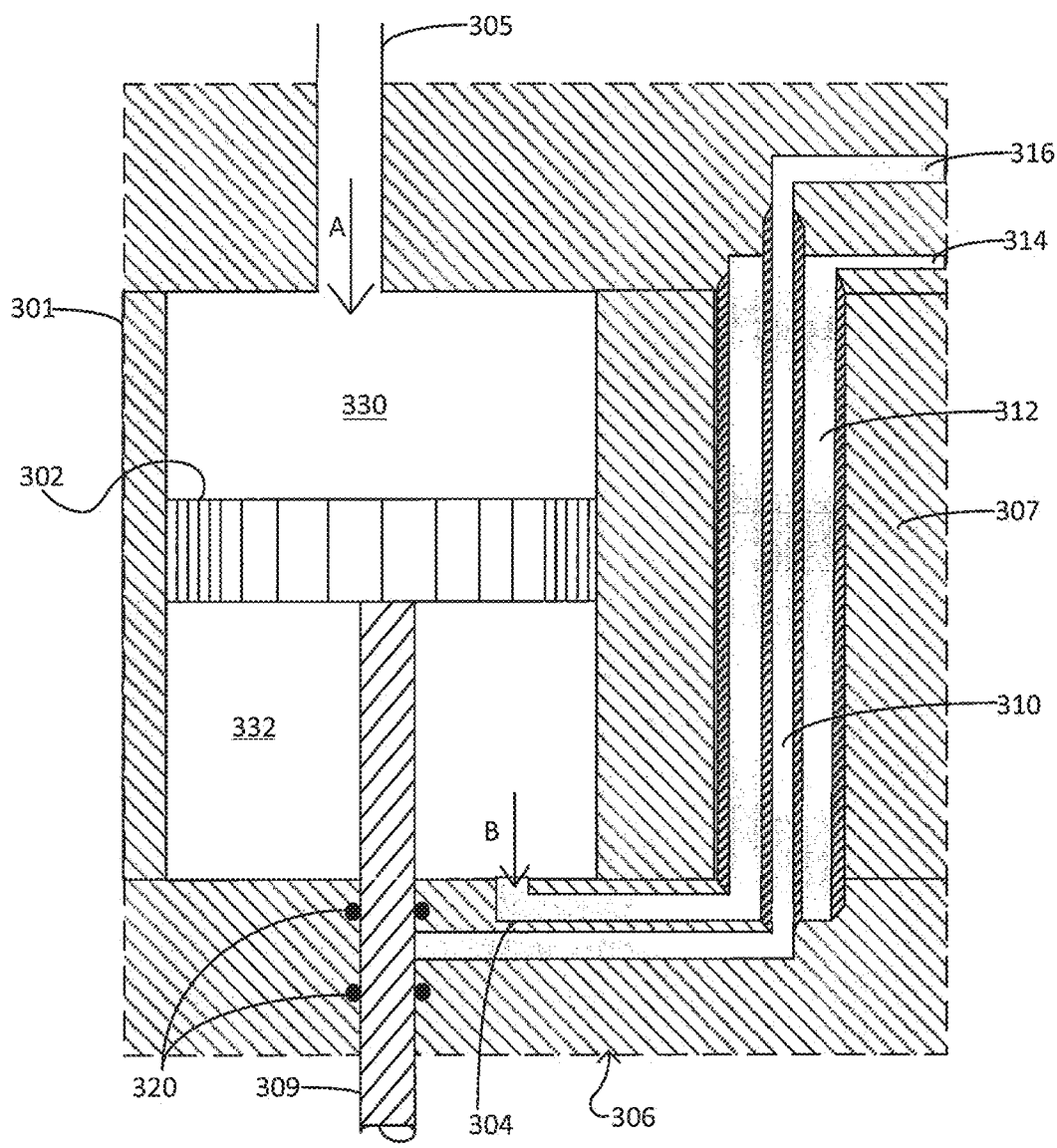
FIG. 3 is cross sectional view of a hydraulic drive unit, with a hydraulic weep line disposed within a hydraulic fluid line.

A detailed view of drive unit 218 is shown in FIG. 3. Specifically, FIG. 3 illustrates a detailed view of a hydraulic drive unit, 318. Hydraulic cylinder 301 is shown, within which piston 302 is disposed. Piston 302 is hydraulically driven, and reciprocates by directing pressurized hydraulic fluid to opposite sides of piston 302 in an alternating fashion, producing reciprocating linear motion.

Specifically, pressurized hydraulic fluid flows from a hydraulic fluid reservoir (not shown) into hydraulic cylinder 301 in the direction shown by arrow A, via a high pressure conduit herein referred to as first hydraulic fluid line 305, filling first hydraulic chamber 330. The pressurized hydraulic fluid exerts a force on piston 302 causing piston 302 to move downwards, in the direction shown by arrow A. Simultaneously, pressurized hydraulic fluid is pushed out of second hydraulic chamber 332 to the hydraulic fluid reservoir via second hydraulic fluid line 312, in the direction shown by arrow B. Second hydraulic chamber 332 extends annularly around drive shaft 309.

Hydraulic drive unit 318 comprises one or more valves (not shown, and in other embodiments may be separate from the hydraulic drive unit) that are actuated when piston 302 completes its stroke, such that at the end of the piston stroke, pressurized hydraulic fluid now enters second hydraulic chamber 332 via second hydraulic fluid line 312, pushing the piston upwards (opposite the direction shown by arrow A), forcing the pressurized hydraulic fluid out of first hydraulic chamber 330 to the hydraulic fluid reservoir, via first hydraulic fluid line 305.

Drive shaft 309 is rigidly connected to piston 302, and operatively connects pump 216 to drive unit 218 (318 in the case of a hydraulic drive unit), such that as piston 302 and drive shaft 309 reciprocate, pump 216 is actuated. In an exemplary embodiment, pump 216 is a reciprocating piston pump, such that drive shaft 309 extends between hydraulic drive unit 318 and pump 216, and as drive shaft 309 reciprocates, drive shaft 309 actuates the piston in pump 216 to reciprocate.

Any hydraulic fluid that leaks along drive shaft 309 past shaft seals 320 within end plate 306 is collected via another fluid line, herein referred to as weep line 310. Weep line 310 is located within endplate 306, with an opening to the bore within which drive shaft 309 reciprocates, to collect hydraulic fluid that leaks past shaft seals 320, thus preventing leaked hydraulic fluid from collecting in the sleeve that extends to the pump.

This leaked hydraulic fluid is directed outside pump housing 307 via weep line outlet 316 and returned to the hydraulic fluid reservoir. Hydraulic drive units are conventionally designed to minimize fluid leakage from within hydraulic cylinder 301. Thus, the hydraulic fluid that leaks past shaft seals 320 is usually a small quantity at a slow, intermittent, flow rate. This low-flow leaked hydraulic fluid is in contact with the walls of weep line 316, and is exposed to cryogenic temperatures for a longer period of time than the faster flowing high pressure hydraulic fluid that travels through second hydraulic fluid line 312, and is thus more prone to freezing.

In conventional prior art systems with pump drive unit 218 outside storage receptacle 202, weep line 310 (and the low flow leaked hydraulic fluid that travels within it) is exposed to ambient temperatures, and is thus not prone to freezing. To prevent leaked hydraulic fluid from freezing within weep line 310 when pump drive unit 218 is located within storage receptacle 202, weep line 310 is located within pump housing 307, and specifically nested within second hydraulic fluid line 312 to insulate the intermittent and/or low-flow leaked hydraulic fluid within weep line 310, from the surrounding cryogenic temperatures. The continuous flow of high temperature hydraulic fluid within second hydraulic fluid line 312 reduces heat transfer away from weep line 310, thus preventing the leaked hydraulic fluid from freezing.

While particular elements, embodiments and applications of the presently claimed system have been shown and described, it will be understood that exemplary embodiments are disclosed herein as examples of the claimed concepts and described features, and the claimed system is not limited thereto since variations for practicing the same concepts can be made without departing from the scope of the present disclosure, particularly in light of the foregoing teachings.

The invention claimed is:

1. A fluid storage and pressurizing assembly comprising:
   a. a storage receptacle having an inner vessel defining a cryogen space for storing fluid at a storage pressure and a cryogenic temperature, an outer vessel surrounding the inner vessel, and an insulated space between the inner vessel and the outer vessel, and
   b. a pump assembly further comprising:

i. a pump having an inlet disposed within the cryogen space for receiving a quantity of the fluid from the cryogen space, and an outlet for delivering the fluid therefrom; and ii. a pump drive unit, for driving the pump, at least partially disposed within a space defined by the storage receptacle, the pump drive unit comprising a hydraulic drive unit having a hydraulic cylinder and a piston reciprocable therein; a drive shaft connected with the piston extending out of the hydraulic cylinder for actuating the pump; a hydraulic fluid line for fluidly communicating pressurized hydraulic fluid between a hydraulic fluid reservoir and a hydraulic fluid chamber of the hydraulic drive unit; and a hydraulic fluid weep line associated with the drive shaft for collecting hydraulic fluid leaking from the hydraulic cylinder along the drive shaft; and at least a portion of the hydraulic weep line is nested within the hydraulic fluid line to prevent leaked hydraulic fluid from freezing in the hydraulic weep line.

2. The storage and pressurizing assembly of claim 1, wherein the inner vessel and outer vessel each further comprise a sleeve, with the sleeve of the outer vessel extending within the sleeve of the inner vessel into the cryogen space, and whereby the insulated space extends between the sleeve of the outer vessel and the sleeve of the inner vessel.

3. The storage and pressurizing assembly of claim 2, wherein the pump drive unit is at least partially disposed within the sleeve of the outer vessel.

4. The storage and pressurizing assembly of claim 2, wherein the pump drive unit is fully recessed within the sleeve of the outer vessel.

5. The storage and pressurizing assembly of claim 1, wherein the insulated space is an evacuated space.

6. The storage and pressurizing assembly of claim 1, wherein the pump drive unit is substantially surrounded by the cryogen space.

7. The storage and pressurizing assembly of claim 1, wherein the pump drive unit is selected from one of an electric motor, mechanical drive, pneumatic drive, or hydraulic drive.

8. The storage and pressurizing assembly of claim 1, wherein the inner vessel comprises a sleeve extending into the cryogen space.

9. The storage and pressurizing assembly of claim 8, wherein the pump drive unit is at least partially disposed within the sleeve of the inner vessel.

10. The storage and pressurizing assembly of claim 8, wherein the insulated space is an evacuated space.

11. The storage and pressurizing assembly of claim 8, wherein the pump is a reciprocating piston pump comprising at least one piston disposed within a pump cylinder.

12. The storage and pressurizing assembly of claim 11, wherein the reciprocating piston pump pressurizes the fluid to a pressure between 2500 psi-9500 psi.

13. The storage and pressurizing assembly of claim 8, wherein the pump drive unit is fully recessed within the sleeve of the inner vessel.

14. The storage and pressurizing assembly of claim 8, wherein the pump drive unit is substantially surrounded by the cryogen space.

15. The storage and pressurizing assembly of claim 8, wherein the pump drive unit is selected from one of an electric motor, mechanical drive, pneumatic drive, or hydraulic drive.

16. The storage and pressurizing assembly of claim 1, wherein the hydraulic fluid weep line is located within the hydraulic cylinder.

17. The storage and pressurizing assembly of claim 16, wherein the hydraulic weep line is associated with an end plate of the hydraulic cylinder, proximate to the pump.

18. The storage and pressurizing assembly of claim 1, wherein the pump drive unit is surrounded by thermal insulation.

19. The storage and pressurizing assembly of claim 18, wherein the thermal insulation surrounding the pump drive unit comprises an aerogel jacket.

20. The storage and pressurizing assembly of claim 1, wherein the storage receptacle has a storage volume of up to 2000 US gallons.

* * * * *